United States Patent [19]

Scotto et al.

[11] 3,775,035

[45] Nov. 27, 1973

[54] FOAM PLASTIC EXTRUSION APPARATUS WITH PLURALITY OF DIE LIP TEMPERATURE CONTROLS

[75] Inventors: Victor E. Scotto, Uniondale; Maurice W. Blackwelder, Deer Park, both of N.Y.

[73] Assignee: Owens-Illinois, Inc., Toledo, Ohio

[22] Filed: May 25, 1972

[21] Appl. No.: 256,692

Related U.S. Application Data

[62] Division of Ser. No. 2,005, Jan. 12, 1970.

[52] U.S. Cl.................. 425/141, 425/144, 425/378, 264/40
[51] Int. Cl............................................. B29f 3/08
[58] Field of Search.................... 425/141, 144, 378, 425/379; 264/40

[56] References Cited

UNITED STATES PATENTS

| 3,230,902 | 1/1966 | Grimm et al.................... 425/378 X |
| 3,307,215 | 3/1967 | Gerhard et al...................... 425/141 |
| 3,341,388 | 9/1967 | Bunyea........................... 425/141 X |
| 3,391,051 | 7/1968 | Ehrenfreund et al.......... 425/378 X |

*Primary Examiner*—R. Spencer Annear
*Attorney*—Alfred L. Haffner, Jr.

[57] ABSTRACT

Caliper in the cross direction in webs of extruded foamed plastic produced by longitudinal slitting of a tubular extrusion is controlled by differentially heating the extrusion die circumferentially about its axis. This can be accomplished by locating a plurality of independently controllable heaters around the die.

6 Claims, 3 Drawing Figures

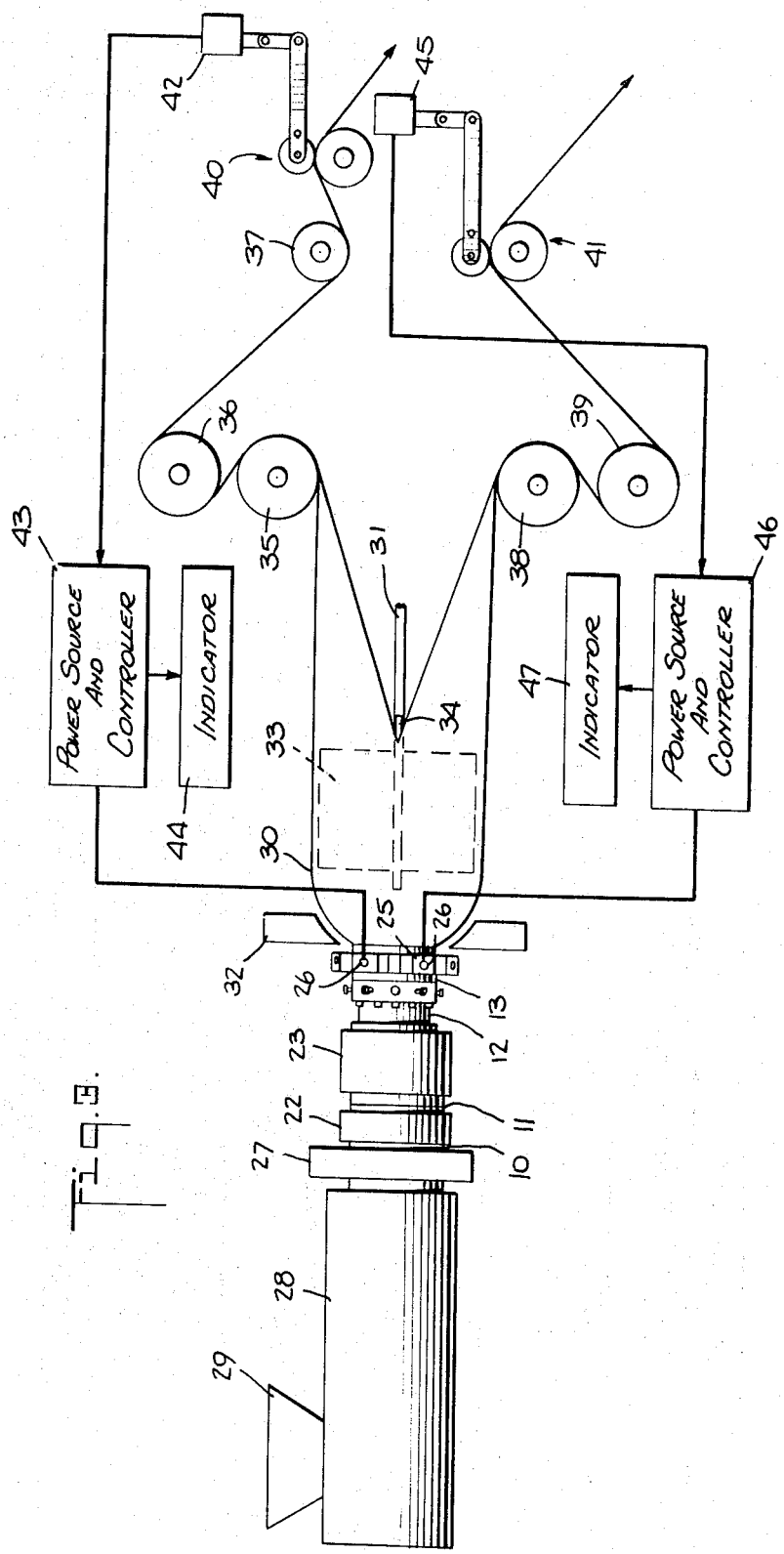

FOAM PLASTIC EXTRUSION APPARATUS WITH PLURALITY OF DIE LIP TEMPERATURE CONTROLS

This is a division of co-pending application Ser. No. 2,005 filed Jan. 12, 1970.

The present invention relates to the extrusion of plastic material. The invention will be described in connection with the extrusion of foamable plastics with which it has been successfully employed.

It has been known that sheets or thin walled sections of foamed plastic can be produced by extruding a quantity of foamable plastic in the form of a tube whereupon the tube is slit longitudinally and unfolded to produce the sheet elements. The satisfactory extrusion of such foamable plastics has proven to be no simple matter. It has been found difficult, if not impossible, to maintain close tolerances on certain dimensions of the resultant sheet material. In particular, it has been a problem to maintain uniform thickness or caliper throughout the cross dimension or width of sheets or webs produced by the aforementioned method.

While uniform caliper is desirable for many reasons, it is particularly important if the surface of the sheet is to be printed. If the thickness varies excessively, the print rolls or platens will be unable to follow the contour resulting in skips or uneven application of ink. The control obtainable with prior fabrication methods has proven inadequate.

One method known heretofore and in widespread use in the plastic extrusion art for controlling cross direction caliper or gauge involves using an adjustable die ring, the concentricity of which can be adjusted with respect to a core rod or mandrel. It has been found, however, that this arrangement does not provide adequate adjustment for eliminating variation in caliper or thickness across the width of a resultant sheet extrusion.

Flexible lip dies of the type described in U.S. Pat. No. 3,349,436 have been tried and found, particularly with larger diameter die orifices, also to be incapable of producing webs of uniform thickness.

It is, therefore, an object of the present invention to provide apparatus for producing webs, particularly wide webs, of foamed plastic with uniform caliper across the width of the web.

Another object of the present invention is to provide foamed plastic sheets of wider usable dimension than those produced heretofore.

A still further object of the invention is to provide means for effecting greater control over the caliper of plastic products produced by extrusion.

In accordance with one aspect of the invention, there is provided apparatus which may be used in a process for producing dimensionally controlled articles of foamed plastic material which comprises the steps of plasticizing a quantity of thermoplastic material by the application of heat, forcing the plasticized material through the orifice of a die, and effecting caloric exchange with the die, which exchange is non-uniform circumferentially about the die and selected to control a dimension of the extruded article. As an example, the apparatus comprise a die with an annular orifice for producing a tubular extrusion and means for heating the die non-uniformly about its axis.

The invention will be better understood after reading the following detailed description of a presently preferred embodiment thereof with reference to the appended drawings wherein:

FIG. 3 is a diagrammatic illustration of an automatic system employing the adpater and die of FIGS. 1 and 2.

Throughout the several views of the drawings, the same reference numerals are used to designate the same or similar parts.

Figure 1:
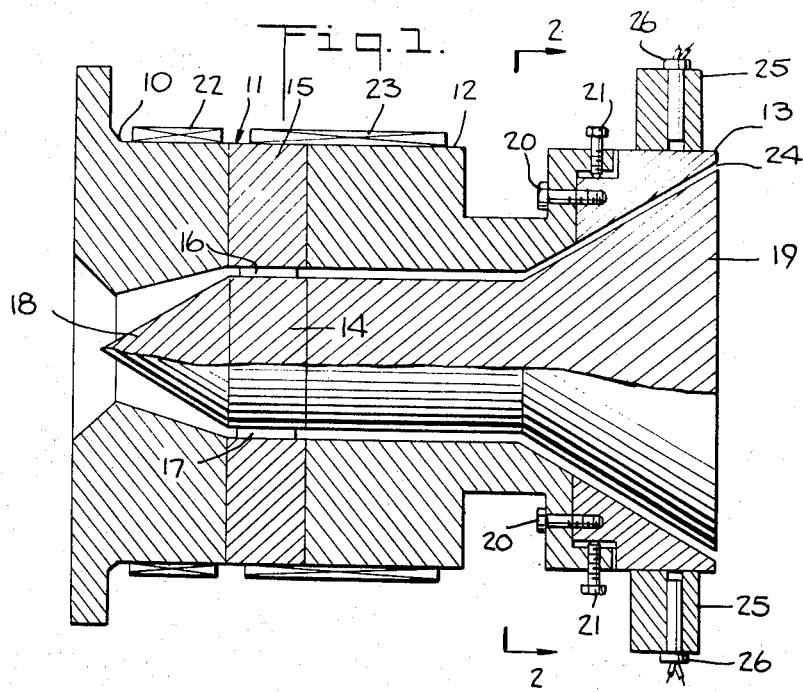
FIG. 1 is a longitudinal sectional view through a diagrammatic representation of an adapter and die assembly embodying the present invention.
Figure 2:
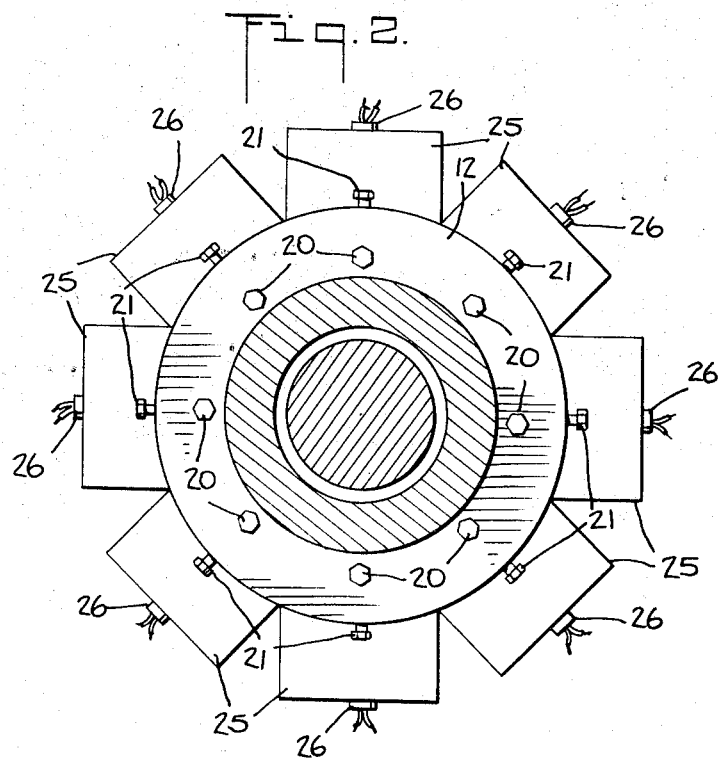
FIG. 2 is a transverse sectional view taken along the line 2—2 in FIG. 1.

Referring to FIGS. 1 and 2, an adapter ring 10 is shown joined in sequence to a spider ring 11, a main die body 12, and an outer die ring or funnel 13. The spider ring 11 has a hub section 14 joined so the peripheral ring 11 by a plurality of circumferentially spaced radial webs, such as that seen at 16 and 17. A nose cone 18 is secured to one side of the hub 14, while a sizing cone or core member 19 is secured to the other side of the hub 14.

As best seen in FIG. 2, the ring 13 is secured to the die body 12 by a plurality of bolts all designated by the numeral 20. When the bolts 20 are loosened, the ring 13 may be adjusted relative to the axis of the extruder for coarse control of caliper by means of the adjusting screws 21, Band heating elements 22 and 23 are located around the members 10, 11, and 12, as shown.

It should be appreciated that the structure described to this point is conventional and would be secured to the forward end of an extruder cylinder in known fashion. Likewise the particular die illustrated has a circular orifice 24 for producing, in known manner, a tubular extrusion. For the purpose of the present specification the term "die" may be considered as encompassing the entire structure shown in FIGS. 1 and 2 unless a contrary meaning is evident from the context.

In accordance with the present invention, the die ring or funnel ring 13 has secured to its periphery (by bolts or other means, not shown) a plurality, here shown as eight, heating blocks 25, each provided with an internal electric heater 26. The blocks 25 should be constructed of metal with good geat transfer characteristics and, although not shown in the drawing, the blocks should also be appropriately insulated externally against undesired heat loss. In use, each of the heaters 26 should be connected electrically to a suitable source of electric power, each adjustable independently either manually or automatically as described hereinafter.

For the purpose of producing sheet material use may be made of the arrangement shown diagrammatically in FIG. 3 to which attention is now directed. The adapter and die assembly of FIGS. 1 and 2 is shown mounted by means of a clamp ring 27 at the end of an extruder cylinder 28 fed from a hopper 29. As the tubular extrusion 30 leaves the die, it is expanded by air under pressure supplied through a conduit 31 and drawn through a cooling or chilling ring 32 over a sizing mandrel 33. The extrusion then passes a pair of diametrically opposed knives, one of which is shown at 34, which slit the tubing longitudinally on opposite sides thereof. The severed sections of the tubing are then flattened and passed over feed and tensioning rolls 35, 36, 37, 38, and 39 to respective gauging stations 40 and 41. In the present example, where eight heating blocks 25 are mounted around the die funnel 13, there should be an equal number of independent thickness gauges located uniformly spaced across the width of the corresponding webs with half at station 40 and half at station 41. For purpose of clarity, only the first gauge element nearest the observer in each station is illustrated. As shown, the gauge 42 at station 40 is connected to a power source and controller 43 which, in turn, is connected both to the corresponding heater element 26 and to an indicator 44. In a similar manner, the gauge 45 at station 41 is connected to a power source and controller 46 which is connected to its corresponding heater element 26 and to an indicator 47.

It will be understood that the gauges at stations 40 and 41 may be of any known design. As shown in FIG. 3, an electrical strain gauge with associated contact linkage is employed. While a contact type gauge is presently preferred, a capacitance-type gauge or a beta radiation gauge may be employed in known manner. It should also be understood that each of the other gauges located but not shown at the separate stations 40 and 41 will be connected through a corresponding power source and controller to the corresponding heater and to an associated indicator. The arrangement is such that when a gauge detects a thickness less than its preset magnitude, it will cause the associated heater to raise the temperature of the corresponding heating block while the converse will occur if the gauge senses an excessive thickness. At the same time, the indicator provides the operator with a visual indication of the caliper at each point.

The exact mechanism by which the non-uniform application of heat circumferentially about the die controls the gauge of the extruded material is not fully understood. One possible explanation is that the non-uniform application of heat to the ring 13 causes differential thermal expansion of the ring to help achieve perfect concentricity with the core rod or mandrel.

Experimentally, it has been determined that changes in thickness can be obtained by applying heat non-uniformly around the adapter ring 10. However, it is not clear and has not been established whether the non-uniform application of heat at the adapter ring serves to compensate for non-uniformly heated material received from the extrusion cylinder or imposes a non-uniform temperature gradient throughout the material as it passes through the die. Furthermore, it is also theoretically possible that by virtue of heat transfer between the material and the die there exists some interrelationship effecting the thermal expansion of the latter to achieve more uniform concentricity with the mandrel.

Regardless of the theory, it has been found impossible prior to the present invention ot obtain close tolerance control of the thickness in the cross direction. The non-uniform application of heat has been found to afford extremely accurate control over the thickness or gauge of the extruded material in the cross direction. It is to be understood, of course, that instead of a plurality of heaters distributed circumferentially around the die, use may be made of a plurality of cooling units so distributed. It is also contemplated that a combination of both may be employed. Hence, the invention contemplates non-uniform caloric exchange circumferentially around the die.

To afford an indication of the effectiveness of the invention it is noted that polystyrene foam has been extruded both with and without the aid of the invention described above. As a result, it has been established that with the aid of the present method it is possible to produce simultaneously two webs each with a width in excess of 30 inches and with a variation in thickness in the cross direction which, for any nominal thickness within the range of 30 to 50 mils, is less than ±1 mil. By contrast, the best control obtained heretofore on 20 inch wide webs without the differential heating control within the same thickness range was about ±3 mils in the cross direction. This involved the use of a die with a flexible lip. However, without the control offered by either the flexible lip or the differential heating as described in the present application, the errors in caliper in the cross direction of webs having a thickness within the range of 30 to 50 mils run as high as 10 to 12 mils. It, therefore, should be evident that the new apparatus provides for uniformity in control of thickness not heretofore obtainable.

When extruding polystyrene foam with the extruder of FIG. 3, the temperature of the die ring 12 may be maintained at approximately 295° F. while the heater blocks 25 may be operated at temperatures ranging between 295° and 305° F. It has been found that this small range of temperature variation is capable of causing a significant change in gauge or caliper.

Although eight heating blocks have been shown in the drawings and described above, it should also be apparent that the number of blocks may be varied to suit the particular situation. More blocks may be used if finer control is desired or with larger diameter dies. In addition, it should be apparent that the invention is applicable to dies having orifices other than annular. For example, the invention could be applied to the control of gauge or caliper in the production of sheet material directly through a straight slit-type orifice. In other words, all that is required is that means be provided for effecting independently selectable caloric exchange with circumferentially adjacent portions of the die along and on at least one side of the orifice.

For purpose of illustration, an arrangement for automatic control has been shown in FIG. 3. However, it should be evident that the heaters 26 can be controlled manually by an operator in response to any suitable downward stream measurement of the uniformity in cross direction thickness of the resultant extrusion.

Throughout the foregoing discussion repeated reference has been made to variation of dimension in the cross direction. Those skilled in the art will understand that there also will be variation in the machine or longitudinal direction due to conditions or circumstances unrelated to the problem at which the present invention is directed. Machine direction variation in gauge or caliper can be minimized in any known manner. Furthermore, it should also be apparent that the thickness gauges at stations 40 and 41 of FIG. 3, which are used for controlling the heating blocks, can also be used either individually or by averaging their output in an automatic control for machine direction gauge employing known apparatus.

The structure described above makes use of a plurality of independently controllable heaters fur supplying heat non-uniformly circumferentially around the die lips. However, it is to be understood that similar control can be achieved by use of independently controllable cooling units. Furthermore, instead of using core heaters, strip heaters or the like may be employed. Alternatively, the electric heating elements may be eliminated and the heating blocks may be suitably cored and supplied with a fluid passing therethrough for the purpose of heat exchange. Either fluid temperature or flow rate may be used for control. Heat may be added or subtracted in this manner, as desired.

The invention has been described with reference to one embodiment thereof. However, it will be understood by those skilled in the art that various changes may be made in the construction of the equipment and in the operation of the process without departing from the true spirit and scope of the invention.

What is claimed is:

1. In apparatus for producing an article of foamed thermoplastic material comprising an extruder having a cylinder, a die with a narrow slit orifice defined by lips on opposite sides thereof and having a passageway leading to said lips, said article emerging from said die through said orifice, means interconnecting said passageway and said cylinder for directing material from said cylinder into said passageway, means for forcing material from said cylinder into said passageway and through said orifice and means for heating plastic material in said cylinder to extruding temperature, the combination therewith of means for controlling the thickness of said article comprising means for supplying independently selectable quantities of heat to adjacent portions of said die distributed lengthwise of said orifice and on at least one side of said orifice, said last-mentioned means being disposed adjacent said lips, means for measuring the thickness of said article at portions of said article formed at said portions of said die and means controlled by said measuring means for controlling the heat supplied by said heat supplying means to said portions of said die.

2. Apparatus according to claim 1, wherein said die lips are formed by a radially outer ring and a coaxial mandrel with said slit orifice therebetween, and said means for supplying heat to said die comprises a plurality of independently controllable heaters disposed around said ring in circumferentially spaced and heat transfer relation thereto.

3. Apparatus according to claim 1, wherein said orifice is annular and said lips are circular and wherein said means for supplying independently selectable quantities of heat comprises a plurality of independently controllable heaters mounted on said die radially of said orifice and in heat transfer relation with the outer one of said lips, said heaters being spaced from each other in a direction circumferentially of said orifice.

4. In apparatus for producing an article of foamed thermoplastic material comprising an extruder having a cylinder, a die with a narrow slit orifice defined by lips on opposite sides thereof and having a passageway leading to said lips, said article emerging from said die through said orifice, means interconnecting said passageway and said cylinder for directing material from said cylinder into said passageway, means for forcing material from said cylinder into said passageway and through said orifice and means for heating plastic material in said cylinder to extruding temperature, the combination therewith of means for controlling the thickness of said article comprising independently controllable means disposed adjacent one of said lips in heat transfer relation thereto and distributed lengthwise of said orifice for separately adjusting the temperatures of a plurality of adjacent portions of said one lip distributed lengthwise of said orifice.

5. Apparatus according to claim 4, wherein said independently controllable means comprises a plurality of heaters mounted on said one lip and spaced from each other in the length direction of said orifice.

6. Apparatus according to claim 5, wherein said orifice is annular and said heaters are disposed radially outwardly of said orifice and are spaced from each other in a direction circumferentially of said orifice.

* * * * *